Sept. 25, 1934.   A. Y. DODGE   1,974,562
BRAKE
Filed May 22, 1930

INVENTOR.
Adiel Y. Dodge
BY
ATTORNEY

Patented Sept. 25, 1934

1,974,562

UNITED STATES PATENT OFFICE 1,974,562

BRAKE

Adiel Y. Dodge, South Bend, Ind., assignor to Bendix Brake Company, South Bend, Ind., a corporation of Illinois Application May 22, 1930, Serial No. 454,583

4 Claims. (Cl. 188—78)

This invention relates to brakes and more particularly to means for dampening vibrations thereof.

It is well established that brakes, owing to a change in the co-efficient of friction, caused by various foreign elements and other causes such as a non-uniform radius or deformation of the braking elements, frequently build up vibrations to an audible pitch which becomes exceedingly annoying and objectionable.

Frequently, when brake shoes are firmly pressed into engagement with the drum, there is produced what is generally known as a high pressure squeal. It has been found that when the brake shoes are firmly held in engagement with the drum, the shoes themselves frequently vibrate at approximately the same pitch as the drum. To avoid this harmonious vibration, which frequently amplifies itself to great magnitude, it is deemed desirable to provide a structure wherein the respective braking elements or shoes have an entirely different natural period of vibration.

An object of the invention is to provide a brake having a plurality of shoes with means for varying the period of vibration of the respective shoes.

Another object of the invention is to provide a brake having braking elements and means positioned thereon for varying the periods of vibrations of the respective elements so that the building up of audible vibrations is impossible.

A further object of the invention is to provide a brake having braking elements and means associated therewith having entirely different natural periods of vibrations with respect to the braking elements.

The invention contemplates a braking mechanism comprising a plurality of braking elements each of which has an entirely different natural period of vibration, so that the waves set up by the vibration of one element will work in opposition to the waves set up by another, thereby causing a dampening effect and preventing harmonious amplifications of the vibrations.

Other objects of the invention will appear from the following description taken in connection with the drawing, which forms a part of this specification, and in which.

Figure 1:
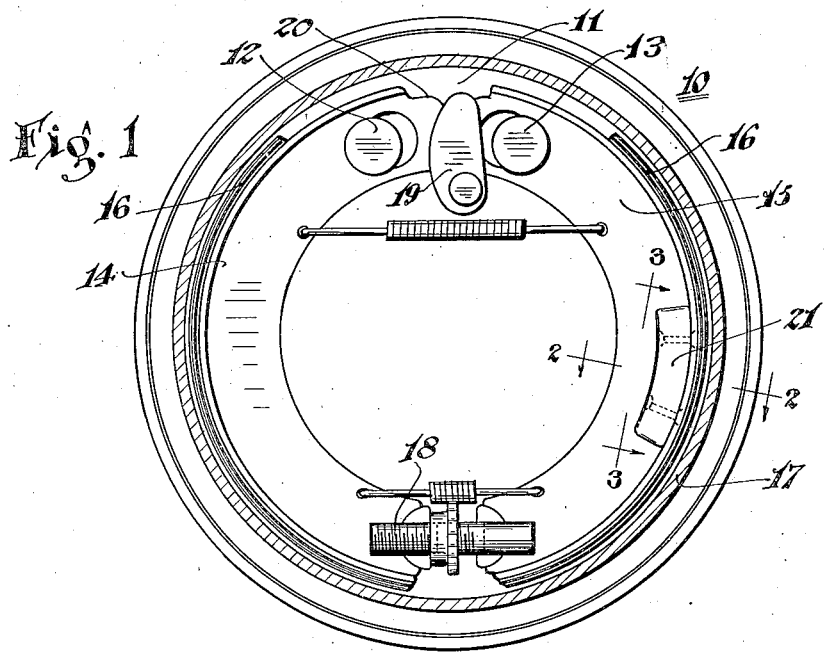
Figure 1 is a side elevation of a brake illustrating the invention as applied.
Figure 2:
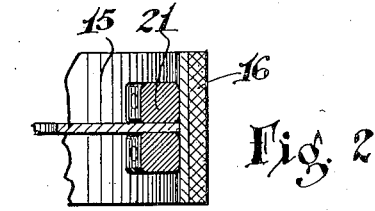
Figure 2 is a sectional view substantially on line 2—2, Figure 1.
Figure 3:
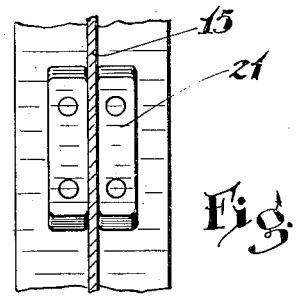
Figure 3 is a sectional view substantially on line 3—3, Figure 1.

Referring to the drawing for more specific details of the invention, 10 represents generally a brake mechanism comprising a backing plate 11 having positioned thereon two anchor bolts 12 and 13. Mounted for movement on the respective anchor bolts are brake shoes 14 and 15, each provided with the conventional lining 16 adapted to engage a brake drum 17 which may be secured to a wheel, not shown.

The brake shoes 14 and 15 are connected at their articulating ends by a suitable connection 18, and positioned between the anchor bolts 12 and 13 is a cam 19 engaging suitable shoulders 20 on the shoes.

In the structure thus far described, the vibrations caused by the two shoes which have like periods of vibration will appear graphically as a smooth wave around the entire periphery of the drum. It is therefore apparent that it is highly desirable to provide means for producing an entirely different natural period of vibration in each of the shoes, so that one of the shoes will be out of resonance in order that the waves set up by one shoe will work in opposition to the waves set up by another. One of the shoes is provided with a weight 21 of substantial mass riveted or otherwise rigidly secured to the web on its respective sides, thus changing the period of vibration of the shoes with respect to each other and preventing harmonious amplifications.

Figure 4:
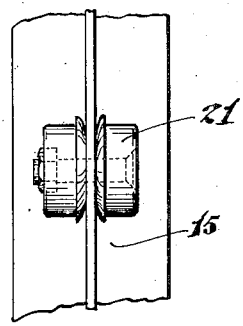
Figure 4 illustrates a brake shoe embodying a modified form of the invention.
Figure 5:
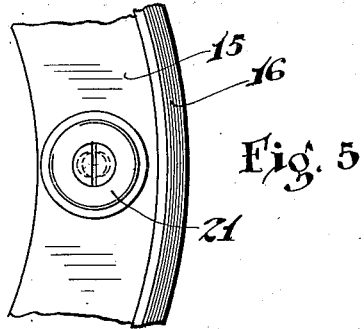
Figure 5 is an elevation of the modification.

In Figures 4 and 5, I have shown a modified form of the invention wherein the weights 21 are secured to the web of the brake shoe with small play to provide a relative movement between the weight and the shoe which will effectively destroy the natural vibrations of the respective shoe upon which it is positioned.

Although the invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is new and desire to secure by Letters Patent is:

1. A brake comprising two brake shoes of similar size and shape and means positioned on one of the brake shoes for imparting thereto an entirely different natural period of vibration with respect to the other shoe.

2. A brake comprising a pair of brake shoes of similar size and shape and having equal periods of vibration, and a weight attached to one of the shoes to change the period of vibration thereof relative to that of the other shoe.

3. A brake comprising a plurality of brake shoes of similar size and shape and a weight movably positioned on one of the brake shoes and adapted to modify the vibratory characteristics thereof.

4. A brake comprising a plurality of brake shoes of similar size and shape and means associated therewith for causing the period of vibration of one of the shoes to differ from that of the other shoe or shoes.

ADIEL Y. DODGE.